United States Patent
Wang et al.

(10) Patent No.: US 7,689,005 B2
(45) Date of Patent: Mar. 30, 2010

(54) APPARATUS AND METHOD FOR BIOMETRIC DATABASE MANAGEMENT SYSTEM

(76) Inventors: Yingbin Wang, 6+8 Coral Reef Dr., Gaithersburg, MD (US) 20878; Tianlong Chen, 38 Timber Rock Rd., Gaithersburg, MD (US) 20878-2229

( * ) Notice: Subject to any disclaimer, the term of this patent is extended or adjusted under 35 U.S.C. 154(b) by 1255 days.

(21) Appl. No.: 11/064,266

(22) Filed: Feb. 22, 2005

(65) Prior Publication Data

US 2005/0223016 A1    Oct. 6, 2005

Related U.S. Application Data

(60) Provisional application No. 60/551,926, filed on Mar. 10, 2004.

(51) Int. Cl.
G06K 9/00 (2006.01)
G06K 9/54 (2006.01)

(52) U.S. Cl. ........................... 382/115; 382/305
(58) Field of Classification Search .................. None
See application file for complete search history.

(56) References Cited

U.S. PATENT DOCUMENTS

| | | | |
|---|---|---|---|
| 5,005,206 A * | 4/1991 | Naillon et al. | 382/253 |
| 5,073,950 A * | 12/1991 | Colbert et al. | 382/115 |
| 5,237,661 A | 8/1993 | Kawamura et al. | |
| 5,432,864 A * | 7/1995 | Lu et al. | 382/118 |
| 5,765,181 A | 6/1998 | Oberlin et al. | |
| 5,809,495 A | 9/1998 | Loaiza | |
| 5,913,219 A | 6/1999 | Baek et al. | |
| 5,914,727 A * | 6/1999 | Horan et al. | 345/503 |
| 6,105,024 A | 8/2000 | Graefe et al. | |
| 6,199,141 B1 | 3/2001 | Weinreb et al. | |
| 6,304,867 B1 | 10/2001 | Schmidt | |
| 6,370,280 B1 * | 4/2002 | Cok et al. | 382/284 |
| 6,400,853 B1 * | 6/2002 | Shiiyama | 382/305 |
| 6,850,147 B2 * | 2/2005 | Prokoski et al. | 340/5.53 |
| 2002/0147764 A1 * | 10/2002 | Krupczak | 709/202 |
| 2002/0152266 A1 * | 10/2002 | Burfeind et al. | 709/203 |

(Continued)

OTHER PUBLICATIONS

TimesTen Performance Software White Paper, "Architected for Real-Time Data Management—Times Ten's Core In-Memory Database Technology," TimesTen Performance Software 2001, pp.
"The Magic garden Explained" by B. Goodheart and J. Cox (1994).

*Primary Examiner*—Bhavesh M Mehta
*Assistant Examiner*—Alex Liew
(74) *Attorney, Agent, or Firm*—24IP Law Group; Timothy R. DeWitt

(57) ABSTRACT

A method and system for constructing a database management system for managing biometric data is disclosed. The disclosed system receives data from another database or from and enrollment process, encodes the data with an encoding plug-in, and stores the encoded data in a biometric data storage. The data may be enhanced before being stored. Incoming target data likewise is encoded using an encoding plug-in and may be pre-processed, and is sent to a matching algorithm that is either built-in or a plug-in algorithm. Further processing may occur after application of the matching algorithm. The disclosed database management system can be used not only for biometric database, but also for other similar types of data management.

9 Claims, 1 Drawing Sheet

U.S. PATENT DOCUMENTS

| | | | |
|---|---|---|---|
| 2003/0007669 A1* | 1/2003 | Martinez | 382/118 |
| 2003/0091218 A1* | 5/2003 | Hamid | 382/124 |
| 2004/0093349 A1* | 5/2004 | Buinevicius et al. | 707/104.1 |
| 2004/0213437 A1* | 10/2004 | Howard et al. | 382/115 |

* cited by examiner

APPARATUS AND METHOD FOR BIOMETRIC DATABASE MANAGEMENT SYSTEM

CROSS-REFERENCE TO RELATED APPLICATIONS

This application claims the benefit of the filing date of U.S. Provisional Application Ser. No. 60/551,926 filed on Mar. 10, 2004 and entitled "Apparatus and Method for Biometric Database Management System."

Data-Driven Database Management System, Ser. No. 11/044,698 filed Jan. 27, 2005 claiming the benefit of U.S. Provisional Application Ser. No. 60/546,233 filed on Feb. 20, 2004; Inventors: Tianlong Chen and Jonathon Vu.

Memory-Resident Database Management System and Implementation Thereof; Ser. No. 10/347,678; Filed on Jan. 22, 2003; Inventors: Tianlong Chen, Jonathan Vu.

Distributed Memory Computing Environment and Implementation Thereof; application Ser. No. 10/347,677, Filed on Jan. 22, 2003; Inventors: Tianlong Chen, Jonathan Vu, Yingbin Wang.

Invariant Memory Page Pool and Implementation Thereof; Ser. No. 10/425,730, Filed on Apr. 30, 2003; Inventors: Tianlong Chen, Yingbin Wang, Yinong Wei.

Central Linked List Data Structure and Methods of Use; Filed Jul. 9, 2002, U.S. Pat. No. 6,785,674; Inventor: Jonathan Vu.

A Method and or System to Perform Automated Facial Recognition and Comparison Using Multiple 2D Facial Images Parsed from a Captured 3D Facial Image; Ser. No. 10/757,144, filed on Jan. 14, 2004 and claiming the benefit of U.S. Provisional Application No. 60/440,338 filed on Jan. 16, 2003; Inventors: Donald A. Milne, III and Jonathon Vu.

Image Indexing Search and Implementation Thereof; U.S. patent application Ser. No. 10/718,738 filed on Nov. 21, 2003 claiming the benefit of U.S. Provisional Patent Application Ser. No. 60/454,315 filed on Mar. 14, 2003; Inventors: Tianlong Chen, Yi Rui, Yingbin Wang, and Yinong Wei.

Single Computer Distributed Computing Method and Apparatus for Facial Identification Enhancement; U.S. patent application Ser. No. 10/425,729; filed on Apr. 30, 2003; Inventors: Tianlong Chen, Donald A. Milne, Iii, Yi Rui, Yingbin Wang, Jonathan Vu, And Yinong Wei.

Integrated Portable Identification and Verification Device; U.S. patent application Ser. No. 10/635,516; filed on Aug. 5, 2003; Inventors: Donald Milne, III and Tianlong Chen.

The entirety of each of the aforementioned patents and applications is incorporated by reference herein.

STATEMENT REGARDING FEDERALLY SPONSORED RESEARCH OR DEVELOPMENT

Not applicable.

FIELD OF THE INVENTION

The present invention is related to biometric database management system architecture and its implementation which can be used for fast management and searching on biometric data.

BACKGROUND OF THE INVENTION

Traditionally, it is common to use relational database management systems (RDB) to manage biometric data. Such relational database management systems are not designed specifically for biometric data and often impose unnecessary data query procedures in biometric data queries and matching requests. Such unnecessary procedures create unnecessary overhead, thereby slowing the data queries and requests.

SUMMARY OF THE INVENTION

The present invention disclosed and claimed herein is a method and system for constructing a database management system for managing biometric data. However, the disclosed database management system can be used not only for biometric database, but also for other similar types of data management.

In an embodiment of the system, a biometric database management system comprises means for encoding reference biometric data, means for enhancing said reference biometric data, a biometric data storage for storing said encoded reference biometric data and said enhanced encoded reference biometric data, means for encoding target biometric data, means for pre-processing said encoded target biometric data, a matching algorithm for comparing said pre-processed encoded target biometric data to said reference biometric data, and means for pro-processing a result of said matching algorithm.

In an embodiment of the method, the method for implementing a biometric database management system comprises the steps of providing a biometric data storage for storing and managing biometric data, providing an enrollment process, providing a searching process, providing an encoding plug-in interface in said enrollment process to convert a biometric data into an encoded biometric data, providing an encoding plug-in interface in said searching process to convert a biometric data into an encoded biometric data, providing a searching algorithm management for said searching process, said searching algorithm having at least functionality of one-to-one similarity comparing of biometric data, providing configurable dataflow for said enrollment and searching processes, and providing a unique ID for a set of biometric data in said biometric data storage.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention. Accordingly, the drawings and descriptions are to be regarded as illustration in nature, and not as restrictive.

DESCRIPTION OF THE PREFERRED EMBODIMENT

Figure 1:
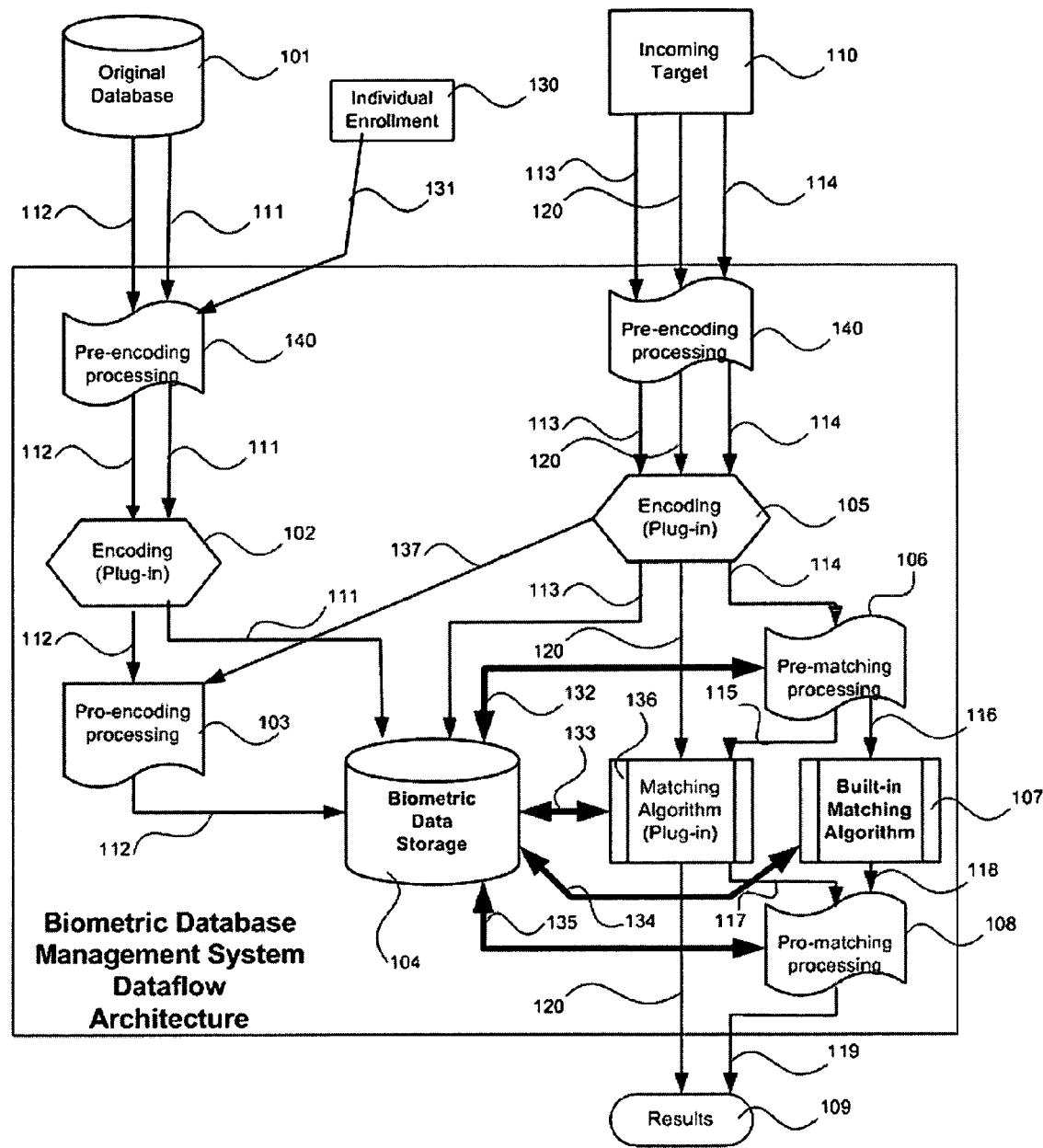
FIG. 1 illustrates a conceptual block diagram of a Biometric Database Management system of the present invention.

FIG. 1 illustrates a conceptual block diagram of Biometric Database Management System dataflow architecture. As part of preprocessing of a reference biometric dataset, biometric data can mainly come from two sources, one from another non-biometric database or dataset 101, and the other from individual enrollment 130. Other sources of course are possible. Since the disclosed biometric database management system (abbreviate as "BDBS" hereafter) is intended to provide uniform data management to handle various biometric data or any other similar data types that require individual data enrollment or batch data enrollment, the BDBS is used to do identification (one-to-one similarity matching), verification and watch list (one-to-many similarity matching with each resulting in a matching score or similarity score) (collectively called "Matching procedure") by comparing a given one or many of the same type of data, called "Incoming Target" 110 in FIG. 1, with the data in the Biometric Data Storage 104. Multiple different types of biometric data can be stored in the BDBS to generate either a combined similarity score or a set of separated similarity scores, or any configurable combination of the combined and separated scores.

Still referring to FIG. 1, the Biometric Database Management provides all necessary management functionalities and interfaces to handle various biometric data or the like.

Still referring to FIG. 1, the BDBS provides a set of Encoding related interfaces 140, 102 and 103. Among them, the plug-in Encode interface 102 is to encode the incoming data (normally an image) to an encoded template which is normal for biometric data. For some special biometric data, this Encode interface can be a do-nothing procedure. A plug-in interface is an Application Programming Interface that provides for a user to compile and link to the database or provide a dynamically linked library such as a .DLL library file in Windows environment. Such a dynamically linked library is the most preferable method. When multiple biometric data is involved, one different such plug-in may be required for each different biometric data type. A separate Pre-encoding process 140 is provided for any pre-processing before encoding, which normally includes image quality enhancement and the like. And this Pre-encoding process 140 can be configurable and a plug-in or built-in or a do-nothing procedure. "Built-in" means that it is provided directly by the BDBS, whereas "Plug-in" means that the actual functionality is provided by the user of the BDBS.

Still referring to FIG. 1, the BDBS provides a Pro-encoding processing function 103 which will at least provide functionality such as indexing of the biometric data. As an option, a user can provide the indexing functionally to replace the built-in indexation interface 103. A user can configure the BDBS to allow biometric data sources 101 and 130 to follow two different dataflow routes, route 111 without Enhancement processing 103 or route 112 with Enhancement processing 103. Either way, the BDBS will put the encoded biometric data into the Biometric Data Storage 104. As an option, the Enhancement processing procedure can be a built-in or plug-in or combination of built-in and plug-in. It is preferably a built-in functional procedure so the database management knows how data is stored inside the Biometric Data Storage 104.

Still referring to FIG. 1, the BDBS will provide several different and configurable ways to handle matching procedures, which are shown in the right portion of the FIG. 1 diagram.

Still referring to FIG. 1, as similar with the enrollment procedures, the BDBS provides a plug-in interface 105 for encoding the incoming target biometric data and a configurable Pre-encoding process plug-in 140. This Encoding plug-in 105 must provide the same encoding functionality as the Encoding plug-in 102, but it preferably should not include any other functionality (such as indexing).

Still referring to FIG. 1, the BDBS provides another plug-in interface 136, the "Matching Algorithm Plug-in," that provides one or multiple matching algorithms to handle matching comparisons between an incoming target and internal stored biometric data. The output of the matching algorithms should at least provide numerical output or other meaningful similarity scores, such similarity scores preferably better be scaled into 0 to 100 numbers, but it may not be true for some biometric data.

Still referring to FIG. 1, the BDBS provides three more processing functional blocks, referred to as "Pre-Matching Processing" 106, "Built-in Matching Algorithm" 107 and "Pro-Matching Processing" 108. Both Pre-Matching Processing 106 and Pro-Matching processing 108 can be either built-in or plug-in procedures to the BDBS. The "Pre-" or "Pro-" refers to before or after the matching procedure either by the Plug-in Matching algorithm 136 or the Built-in Matching algorithm 107. As an example, such pre-matching processing 106 can calculate the index or index group before the actual matching algorithm, which will decrease the number of actual matching processes needed and therefore is faster. Also as an example of the multiple biometric data types or multiple similarity scores generated by matching algorithms, the pro-matching processing procedure 107 can be a list of similarity scores or a combined (or called fused) similarity score such as a similarity score from a group voting procedure as indicated in the patent application "METHOD AND APPARATUS FOR FACIAL IDENTIFICATION ENHANCEMENT" filed on Aug. 7, 2003 with Ser. No. 10/635,565 by Tianlong Chen, etc.

Still referring to FIG. 1, the dataflow from the Incoming Target 110 to the final result 109 can be configurable such that data can go through path 114 with "pre-matching processing" or path 120 without "Pre-matching processing" 106, go through path 115 with plug-in matching algorithm 136 or go through path 116 with built-in matching algorithm 107, and go through path 119 with or path 120 without "Pro-matching processing" 108. That is, either Pre-matching processing or Pro-matching processing can be enabled or disabled by configuration.

Still referring to FIG. 1, the plug-in 136 or built-in Matching Algorithms 107, Pre-Matching Processing 106 and Pro-Matching Processing 108 can all access the Biometric Data Storage 104 via paths 132, 133, 134, and 135.

Still referring to FIG. 1, in order for the plug-in Matching Algorithm interface 136 to access the Biometric Data Storage 104 correctly, a set of functions will be provided to user to hide an internal data storage format to protect database integrity. Such a set of functions should include at least "read" of one unit of stored biometric data.

Still referring to FIG. 1, the encoded biometric data from Incoming Target 110 can be stored into the Biometric Data Storage 104 via path 113 or indirectly into the Biometric Data Storage 104 through paths 137 and 112.

Still referring to FIG. 1, in order to process the biometric data fast, not all information related to a person will be stored in the BDBS. The other information can best be stored other types of database such as relational database. Therefore, in the BDBS, each person or identity of a set of biometric data should have a unique ID to be used to retrieve such other information from other databases.

Still referring to FIG. 1, since the biometric data normally is a binary string or a set of numeric data, the indexing or indexing group calculation in the pro-encoding processing 103 can be a neural network indexing procedure, which can provide better and balanced categorization. Other indexing schemes may be used, such as the scheme disclosed in the patent application "Image Indexing Search and Implementation Thereof" filed by Tianlong Chen, etc. with Ser. No. 10/718,738. Normally without indexing or an indexing group, the sequential searching (meaning searching one after another through Biometric Data Storage 104) will take a much longer time than an indexed search. But as a configurable option, user can make a sequential searching also through the BDBS.

In the case of facial recognition, the pre-encoding process may include a procedure to generate a set of 2D morphed images or reconstructed 3D models from a given incoming image (called parent image, normally belonging to one person or one identity), then in the internal data storage, each morphed image in the set will not only have same unique ID for the parent image, but also may have its own sub-ID.

Still referring to FIG. 1, to provide faster biometric retrieval speed, the whole Biometric Database Management System can be built as an in-memory database, which can utilize the DMCE capability disclosed in the patent application "Distributed Memory Computing Environment and Implementation Thereof" application Ser. No. 10/347,677. Such capability includes the use of a virtual address referred to as a "DMCE virtual address."

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for implementing a biometric database management system, comprising the steps of:
   storing encoded biometric data in a biometric database on a biometric data storage;
   running an enrollment process on a server, said enrollment process comprising an encoding plug-in interface in said biometric database to convert a biometric data into an encoded biometric data;
   converting target biometric data into an encoded target biometric data with an encoding plug-in interface;
   searching said biometric database, using a plug-in interface, for customized one-to-one similarity comparing said encoded target biometric data to encoded biometric data in said biometric database; and
   providing a unique ID to said sewer for a set of related encoded biometric data in said biometric data storage
   using said unique ID to retrieve information other than biometric data from a second database, wherein said second database is separate from said biometric data storage.

2. A method according to claim 1 further comprising a step of executing a customized pre-encoding process before said encoding through a plug-in interface.

3. A method according to claim 1 farther comprising a step of executing a customized pro-encoding process after said encoding through a plug-in interface.

4. A method according to claim 1 further comprising a step of executing a customized indexing or index grouping on stored biometric data through a plug-in interface.

5. A method according to claim 1 further comprising a step of executing a customized matching algorithm interface to handle matching between two encoded biometric data through a plug-in interface, and said matching algorithm generates a similarity score as a comparison result.

6. A method according to claim 1 further comprising a step of executing a customized matching algorithm over stored biometric data as part of an integrated searching algorithm through a plug-in interface.

7. A method according to claim 1 further comprising the step of executing a customized pre-matching procedure before the said searching algorithm through a plug-in interface, and said pre-matching plug-in procedure can access said biometric data storage.

8. A method according to claim 1 further comprising the step of executing a customized wherein said searching process includes a pro-matching procedure after the said searching algorithm through a plug-in interface, and said pro-matching plug-in procedure can access said biometric data storage.

9. A biometric database management system comprising:
   a plug-in interface for encoding biometric data by a customized encoding algorithm;
   a plug-in interface for enhancing said reference biometric data by a customized enhancing algorithm;
   a biometric data storage for storing said encoded reference biometric data and said enhanced encoded reference biometric data, said biometric data storage storing only biometric data;
   means for encoding target biometric data;
   a plug-in interface for pre-processing said encoded target biometric data before said encoding by to said customized encoding algorithm;
   a plug-in interface for comparing biometric data to reference biometric data using a customized matching algorithm;
   a plug-in interface for pro-processing a result of said matching algorithm after executing said comparison of biometric data; and
   a plug-in for providing a unique ID to said server for a set of related encoded biometric data in said biometric data storage, wherein using said unique ID to retrieve information other than biometric data from a second database, wherein said second database is separate from said biometric data storage.

* * * * *